(12) United States Patent
Miyabe

(10) Patent No.: US 6,739,609 B2
(45) Date of Patent: May 25, 2004

(54) FRONT FORK

(75) Inventor: Tetsuya Miyabe, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/176,619

(22) Filed: Jun. 24, 2002

(65) Prior Publication Data

US 2003/0001359 A1 Jan. 2, 2003

(30) Foreign Application Priority Data

Jun. 28, 2001 (JP) ........................................ 2001-196024

(51) Int. Cl.[7] .............................................. B62K 25/08
(52) U.S. Cl. ...................... 280/276; 280/279; 188/284; 188/286; 188/288
(58) Field of Search ................................. 280/276, 275, 280/277, 283; 188/284, 285, 286, 287, 288, 289

(56) References Cited

U.S. PATENT DOCUMENTS

| | | | | |
|---|---|---|---|---|
| 4,424,980 A | * | 1/1984 | Tsukamoto et al. | 280/276 |
| 4,807,860 A | * | 2/1989 | Simons | 267/217 |
| 4,964,625 A | * | 10/1990 | Kawamura | 267/221 |
| 5,862,895 A | * | 1/1999 | Ricard | 188/289 |
| 6,234,505 B1 | * | 5/2001 | Ito | 280/276 |
| 6,568,664 B2 | * | 5/2003 | Furuya | 267/64.26 |

FOREIGN PATENT DOCUMENTS

| | | | | |
|---|---|---|---|---|
| JP | 07-174179 | | 7/1995 | |
| JP | 10-103399 | | 4/1998 | |
| JP | 2001349367 A | * | 12/2001 | F16F/9/50 |

* cited by examiner

Primary Examiner—Lesley D. Morris
Assistant Examiner—Daniel Yeagley
(74) Attorney, Agent, or Firm—Rabin & Berdo, PC

(57) ABSTRACT

The production of sharp shocks is prevented by increasing resilient gas characteristics in response to the compression stroke acting on a front fork. The front fork comprises a tube 1 connected to the vehicle body and a tube 2 connected to the vehicle wheels and engaging to slide freely with respect to the tube 1. A damper 3 and a suspension spring 7 which is biased in a direction in which the tubes 1, 2 are extended are provided in an interior space between the vehicle-body tube 1 and the vehicle-wheels tube 2. A first gas chamber 4 and an oil chamber 5 into which oil is introduced from the damper 3 are formed in the interior space. A second gas chamber 9 is provided which is connected to the first gas chamber 4 through a orifice 10. A space A which is provided between the outer periphery of the suspension spring 7 and the inner periphery of the vehicle-body tube 1 and is closed by entry of the tip 2a of the vehicle-wheel tube 2. Holes 15a, 15b are provided in the oil chamber 5 and allow flow of all oil after the space A is closed.

6 Claims, 3 Drawing Sheets

# FRONT FORK

FIELD OF THE INVENTION

This invention relates to a front fork for a motor cycle. In particular, it relates to a front fork which sharply increases a damping force in proximity to a maximum compression stroke.

BACKGROUND OF THE INVENTION

A front fork is such that a tube connected to the vehicle wheels is inserted to slide freely in a tube connected to the vehicle body. These tubes undergo compression or extension operations relative to one another due to vibrations input to the motor cycle.

A front fork as disclosed for example in JP-A7-174179 or JP-A10-103399 generates a strong damping force in proximity to maximum compression during a compression stroke in order to prevent the compressed tubes from colliding with one another.

However this type of front fork may produce a shock since an excessively strong damping force is rapidly produced in proximity to maximum compression. When such a shock is transmitted from the front fork to the vehicle body, the rider receives an unpleasant sensation and thus riding comfort is adversely affected.

SUMMARY OF THE INVENTION

It is therefore an object of this invention to provide a front fork which improves riding comfort by preventing the generation of a shock by gradually increasing the damping force in proximity to maximum compression of a front fork.

In order to achieve above the object the invention provides a front fork for a motor cycle which comprises a tube connected to a vehicle body; a tube connected to a vehicle-wheel and engaging to slide freely with respect to the vehicle-body tube; a damper disposed in an interior space between the vehicle-body tube and the vehicle-wheel tube, the damper extending or compressing in response to extension or compression of the tubes; a suspension spring disposed in the interior space between the vehicle-body tube and the vehicle-wheel tube, the suspension spring biased in a direction extending the tubes; a first gas chamber formed in the interior space, and an oil chamber positioned above the first gas chamber and introducing oil from the damper, the oil surface in the oil chamber varying as a result of the compression stroke position of the front fork; a second gas chamber formed in the interior space and connected to the first gas chamber through a orifice; a space A formed between the outer periphery of the suspension spring and the inner periphery of the vehicle-body tube, the space A being closed by enter of the tip of the vehicle-wheel tube, and when the space A is open, oil in the oil chamber flows through the space A; and a hole provided in the first gas chamber, and allowing flow of all oil after the space A is closed.

The details as well as other features and advantages of the invention are set forth in the remainder of the specification and are shown in the accompanying drawings.

DESCRIPTION OF THE PREFERRED EMBODIMENTS

Figure 1:
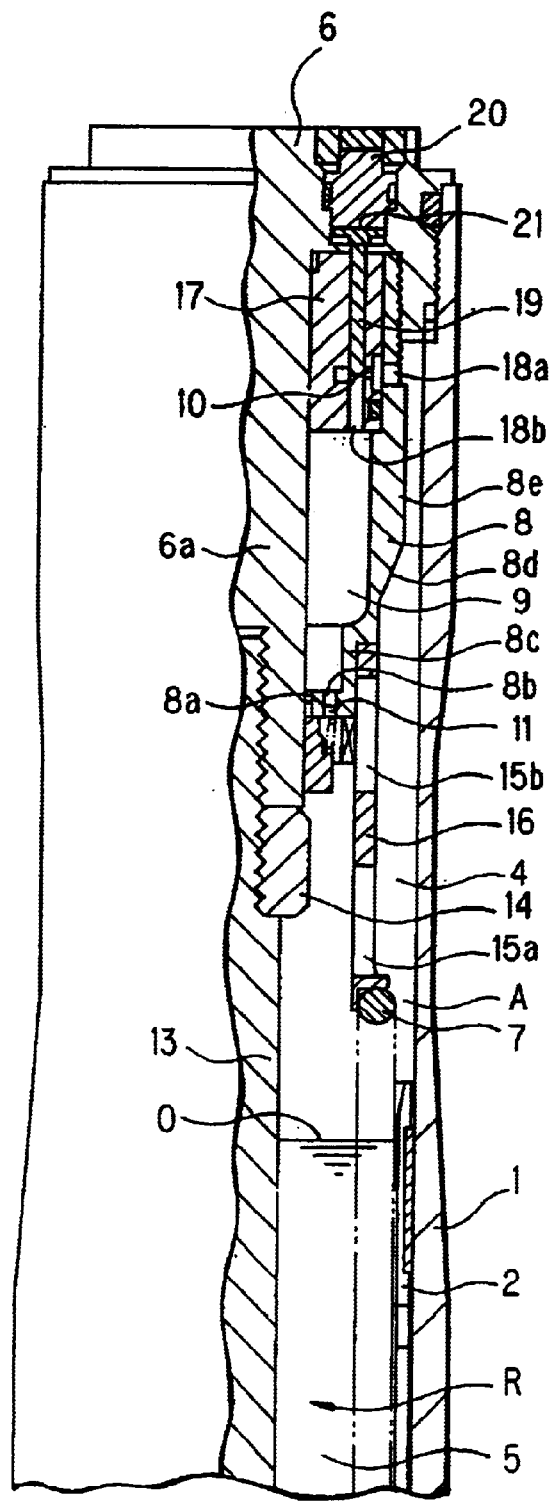
FIG. 1 is a partially enlarged sectional view of a front fork according to this invention.

Embodiments of a front fork according to this invention will be described hereafter referring to FIG. 1 to FIG. 3.

Reference numeral 1 denotes a tube connected to the vehicle body and reference numeral 2 denotes a tube connected to the vehicle wheels. The tubes 1 and 2 are engaged to slide freely with respect to each other.

Figure 2:
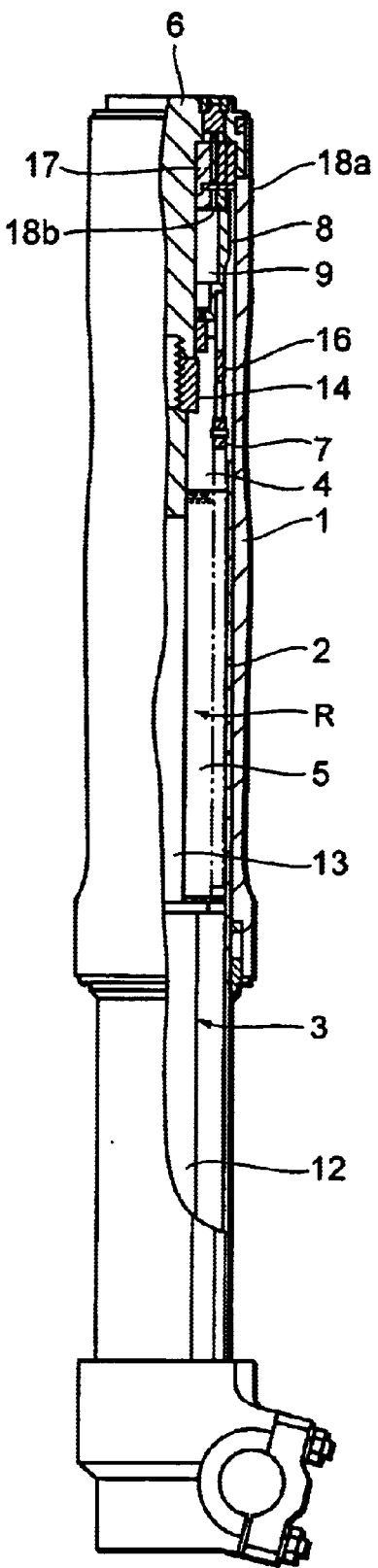
FIG. 2 is a partial longitudinal front sectional view of a front fork.
Figure 3:
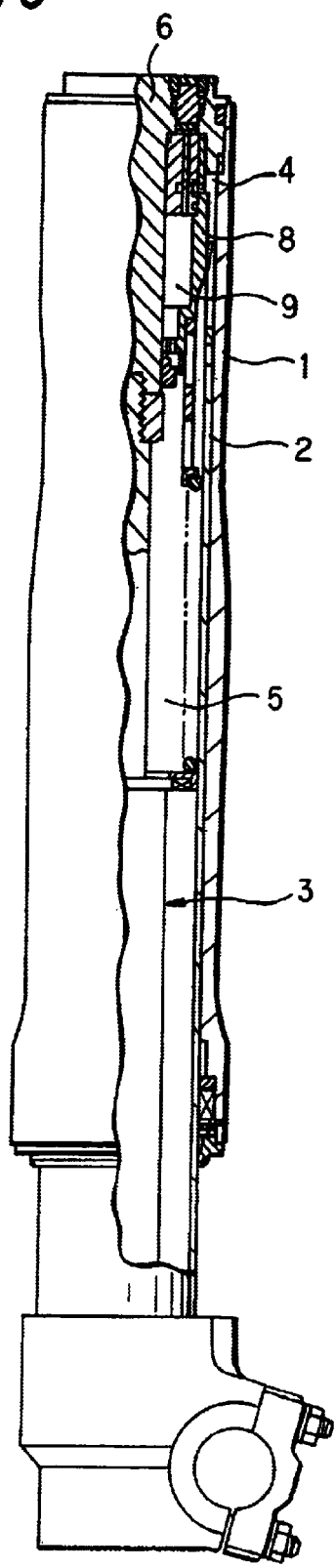
FIG. 3 is a partial longitudinal front sectional view showing a front fork when compressed.

As shown in FIG. 2, a damper 3 is coaxially disposed in the interior of the vehicle-wheel tube 2. The bottom of the damper 3 is fixed to the tube 2 and the tip of the piston rod 13 of the damper 3 is connected to an upper section in the vehicle-body tube 1. Thus when the tubes 1 and 2 undergo compression or extension relative to one another, the piston rod 13 of the damper 3 is also extended or compressed.

A reservoir R is provided in the vehicle-body tube 1 and the vehicle-wheel tube 2. The reservoir R comprises a first gas chamber 4 disposed in an upper section of the tubes and an oil chamber 5 disposed in a lower section of the tubes.

When oil fills the interior of the damper 3 and the piston rod 13 undergoes a compression operation, the oil in the damper 3 is discharged to the oil chamber 5 of the reservoir R. Furthermore when the piston rod 13 undergoes an extension operation, oil is drawn from the reservoir R into the damper 3. In this manner, the position of the oil surface O in the reservoir rises and falls corresponding to the displacement amount produced by the piston rod 13 entering into or withdrawing from the oil in the damper.

The capacity of the interior space also varies due to the entry and extension of the vehicle-wheel tube 2 with respect to the vehicle-body tube 1. Consequently the position of the oil surface also varies as a result of this variation in the capacity.

Thus the speed with which the oil surface O undergoes variation is larger than the speed in which the tip of the tube 2 rises or falls. As a result, as shown in FIG. 1, initially the oil surface O is lower than the tip of the tube 2. However when the compression stroke amount of the front fork increases, the oil surface O shifts to a position which is higher than the tip of the tube 2.

A suspension spring 7 is interposed between the damper 3 and the upper section in the vehicle-body tube 1 in order to support a load acting on the front fork.

The damper 3 is provided with a damper cylinder 12 and a piston rod 13 which is connected to a piston (not shown) disposed in the damping cylinder 12. The top end of the piston rod 13 is threadably connected to a boss 6a in the center of a cap 6 connected coaxially to the top of the tube 1 and is secured by a lock nut 14.

A hollow case 8 is connected in a coaxial position to the cap 6 by a screw. The case 8 is positioned on the outer side of the boss 6a at a fixed interval thereto. A stopper member 17 is engaged to the inner periphery of the upper section of the hollow case 8. Consequently a second gas chamber 9 is partitioned in the interior of the case 8 by the case 8, the stopper member 17, the bottom 8a of the case 8 and the boss 6a of the cap 6.

Interconnected oil passages 18a, 18b are respectively formed in the wall of the case 8 and the stopper member 17 and a orifice 10 is interposed along the oil passages 18a, 18b. The second gas chamber 9 is connected to the first gas chamber 4 through the oil passages 18a, 18b and the orifice 10. The flow amount of gas and oil flowing between the second gas chamber 9 and the first gas chamber 4 is controlled in response to the aperture area of the orifice 10.

A regulating rod 19 is inserted to allow free displacement in a vertical direction in the oil passage 18b of the stopper member 17 in order to regulate the aperture area of the orifice 10. The aperture area of the orifice 10 is regulated by the vertical position of the regulating rod 19. In this manner, the orifice displays a variable orifice function. An adjuster 20 is threadably connected in a hole formed in the upper section of the cap 6. This adjuster 20 may be directly connected to the regulating rod 19 or may be connected through a spacer 21. When the adjuster 20 rotates, the regulating rod 19 displaces in a vertical direction.

However in an alternative arrangement, the orifice 10 may be a fixed orifice which does not vary the aperture area.

A through hole 8b is formed in the bottom 8a of the case 8. A check valve 11 allowing outward flow of oil and gas is provided in the outlet face of the through hole 8b in order to allow flow only from the second gas chamber 9 to the first gas chamber 4.

In this manner, although flow of oil and gas is permitted from the second gas chamber 9 through the check valve 11 to the first gas chamber 4, flow is not permitted from the first gas chamber 4 through the check valve 11 into the second gas chamber 9.

A cylindrical member 16 is engaged at the step portion 8c on the outer lower section of the case 8. The upper end of the suspension spring 7 is supported by the lower end of the cylinder member 16.

A first hole 15a and a second hole 15b are provided at different vertical positions in the wall of the cylindrical member 16. A plurality of holes 15a, 15b may be provided on the circular periphery of the cylindrical member 8.

As shown in FIG. 1, the tip of the vehicle-wheel tube 2 rises during a compression stroke in the front fork. However when the tip of the tube 2 reaches the lower end of the cylindrical member 16, the space A between the inner peripheral face of the vehicle-body tube 1 and the outer periphery of the suspension spring 7 becomes closed.

Although gas and oil rise upwardly from lower sections during a compression stroke of the front fork, when the space A of the tip of the tube 2 is open and the oil surface O of the oil is lower than that position, gas and oil pass through the space A and the vertical holes 15a, 15b.

After the space A is closed, the degree of entry of the piston rod 13 is at a maximum and the oil surface O is positioned above the tip of the tube 2. As a result, oil passes through both the vertical holes 15a, 15b. However throttle resistance to the passage of oil is increased by an amount corresponding to the closure of the space A.

Furthermore the tip of the tube 2 rises from the inclined face 8d provided on the case 8 and reaches the large radius section 8e. In this state, the throttle resistance is further increased as a result of the flow of oil passing through the narrow space between the tip and the case 8.

In addition, oil passes through the orifice 10 and flows into the second gas chamber containing gas under pressure.

Consequently, during a compression stroke of the front fork, the sectional surface area of the passage allowing flow of oil is varied by the elevated position of the oil surface O and results in an increase in resistance to oil flow. That is to say, compression resistance is increased.

The operation of the front fork will be described below.

When an upward force due to a vibration from the road surface is input while the vehicle is running, the front fork is compressed and the vehicle-wheel tube 2 displaces upwardly. At this time, the oil surface O in the oil chamber 5 rises with the result that the first gas chamber 4 is compressed.

Firstly the resilient function as a gas spring will be described with reference to the compression speed of the front fork under these conditions.

When the compression stroke speed is slow, that is to say, when the compression operation is gentle, the elevation speed of the oil surface O is low and the compression of the gas is also gentle. As a result, although gas flows through the orifice 10 to the second gas chamber 9 from the first gas chamber 4, since the speed of gas flow is low, the influence of the throttle resistance is small and the pressure in the second gas chamber 9 increases to substantially the same pressure as the pressure in the first gas chamber 4.

Consequently, the resilient characteristics of the gas spring is defined by the large gas chamber capacity comprising the capacity of the first gas chamber 4 added to the capacity of second gas chamber 9. This results in low spring characteristics. That is to say, the resilient characteristics of the gas display soft compression characteristics.

In contrast, when the compression stroke speed is high, the elevation speed of the oil surface O of the oil chamber 5 is high and the gas is rapidly compressed. Consequently the flow speed of gas flowing into the second gas chamber 9 from the first gas chamber 4 is high and the orifice 10 creates a strong resistance. Thus the pressure in the first gas chamber 4 is conspicuously higher than the pressure in the second gas chamber 9. Thus the effective gas chamber capacity for the formation of the resilient characteristics of the gas spring substantially corresponds only to the first gas chamber 4, that is to say, the overall capacity is reduced. As a result, the spring characteristics are increased and the resilient characteristics of the gas spring display hard compression characteristics.

As shown above, the resilient characteristics of the gas spring can vary the spring characteristics in response to the compression stroke speed of the front fork. That is to say, when the compression speed is low, the gas displays soft resilient characteristics. When the compression speed is high, hard resilient characteristics result. As a result, the front fork provides high stability and riding comfort.

Next the damping characteristics when the compression stroke of the front fork is large will be described with reference to the stroke position.

With respect to either gentle compression or rapid compression of the front fork, when the compression stroke amount is large, the oil surface O rises in the first gas chamber and the surface area of the passage allowing oil flow varies.

In FIG. 1, when the space A is open, the cross-sectional surface area of the passage when oil shifts upwardly takes a maximum value. When the tip of the tube 2 rises and the space A is closed, oil displaces through the first hole 15a and the second hole 15b. Consequently the cross-sectional area of the oil passage is decreased and throttle resistance is increased.

When the compression stroke amount is large and the tip of the tube 2 enters the narrow space provided between the outer periphery of the large radius section 8e of the case 8 and the inner periphery of the tube 1, the passage for oil becomes sharply decreased and a large throttle resistance is produced.

When the compression stroke amount of the front fork increases, the throttle resistance to oil gradually increases as a result. This takes the form of a compression repulsive force on the front fork and produces a large damping force in proximity to maximum compression. In this case, since the damping force for the compression gradually increases, it is possible to avoid generating a shock in proximity to maximum compression and to avoid adverse effects on riding comfort.

This invention is not limited to the above embodiments, various modifications being possible by those skilled in the art within the scope of the appended claims.

What is claimed is:

1. A front fork for a motorcycle, comprising:

a vehicle-body tube connected to a vehicle body;

a vehicle-wheel tube connected to a vehicle-wheel and engaging to slide freely with respect to the vehicle-body tube;

a damper disposed in an interior space formed within the-vehicle-body tube, and having one end connected to said vehicle-wheel tube, and another end connected to said vehicle-body tube, the damper extending or compressing in response to extension or compression of the tubes;

a suspension spring disposed in the interior space, and being longitudinally disposed between the vehicle-body tube and the damper, the suspension spring being biased in a direction extending the tubes;

a first gas chamber formed in the interior space, and an oil chamber positioned below the first gas chamber and introducing oil from the damper, an oil surface in the oil chamber varying as a result of a compression stroke position of the front fork;

a second gas chamber formed in the interior space and connected to the first gas chamber through an orifice;

a space A formed between an outer periphery of the suspension spring and an inner periphery of the vehicle-body tube, the space A being closed by entry of a tip of the vehicle-wheel tube within the space A, and the space A being opened when the tip of the vehicle-wheel tube is moved from within the space A, thereby allowing oil in the oil chamber to flow through the space A;

wherein a hole is provided that communicates with the first gas chamber, and allows a flow of all oil after the space A is closed.

2. The front fork as defined in claim 1, wherein one end of the suspension spring is supported by a lower end of a cylindrical member provided concentrically to the vehicle-body tube.

3. The front fork as defined in claim 2, wherein the hole is provided in the cylindrical member.

4. The front fork as defined in claim 2, wherein a cylindrical case is fixed to an upper section of the cylindrical member, and the tip of the vehicle-wheel tube enters a narrow space defined by an outer periphery of the case in proximity to a maximum compression stroke, and oil flows through the narrow space and between the outer periphery of the case and the tip.

5. The front fork as defined in claim 1, wherein when a compression stroke of the front fork is slow, a gas flows slowly from said first gas chamber to said second gas chamber by way of the orifice, so that said first gas chamber and said second gas chamber collectively provide said front fork with a gas spring having a soft compression characteristic; and wherein when the compression stroke is quick, the orifice restricts the gas from flowing freely from said first gas chamber to said second gas chamber, so that essentially only said first gas chamber provides said front fork with a gas spring having a hard compression characteristic.

6. A front fork for a motorcycle, comprising:

a vehicle-body tube connected to a vehicle body;

a vehicle-wheel tube connected to a vehicle-wheel, and being disposed within said vehicle-body tube, said vehicle-body tube being slidable relative to said vehicle-wheel tube, so that said vehicle-wheel tube and said vehicle-body tube are extendable and contractible during a compression stroke of said front fork;

a damper disposed inside of said vehicle-wheel tube, and having one end connected to said vehicle-wheel tube, and another end connected to said vehicle-body tube, the damper extending or compressing in response to an extension or contraction of said vehicle-wheel tube and said vehicle-body tube, wherein when said damper is compressed, oil is discharged from said damper, and when said damper is extended, oil is drawn into a reservoir;

a suspension spring having one end in engagement with said damper, and another end in engagement with said vehicle-body tube, said suspension spring being biased to extend said vehicle-wheel tube and said vehicle-body tube;

a first gas chamber formed inside of said vehicle-body tube;

an oil chamber positioned below said first gas chamber, and receiving and providing oil to and from said damper, an oil level in said oil chamber varying as said vehicle-wheel tube and said vehicle-body tube are extended and contracted; and a second gas chamber formed inside of said vehicle-body tube and being connected to said first gas chamber through an orifice;

wherein a space A is formed between an outer periphery of said suspension spring and an inner periphery of said vehicle-body tube, the space A being closed by entry of a tip of the vehicle-wheel tube within the space A when said vehicle-wheel tube and said vehicle-body tube are contracted, thereby preventing oil in the oil chamber from flowing through the space A, the space A being opened when the tip of said vehicle-wheel tube is moved from within the space A, when said vehicle-wheel tube and said vehicle-body tube are extended, thereby allowing oil in the oil chamber to flow through the space A;

wherein a hole is provided that communicates said oil chamber with said first gas chamber, and allows a flow of all oil into and out of said first gas chamber when the space A is closed;

wherein when the compression stroke is slow, a gas flows slowly from said first gas chamber to said second gas chamber by way of the orifice, so that said first gas chamber and said second gas chamber collectively provide said front fork with a gas spring having a soft compression characteristic; and wherein when the compression stroke is quick, the orifice restricts the gas from flowing freely from said first gas chamber to said second gas chamber, so that essentially only said first gas chamber provides said front fork with a gas spring having a hard compression characteristic.

* * * * *